United States Patent
Li et al.

(10) Patent No.: US 11,431,998 B2
(45) Date of Patent: Aug. 30, 2022

(54) SYSTEMS AND METHODS FOR DECODING BASED ON INFERRED VIDEO PARAMETER SETS

(71) Applicant: TENCENT AMERICA LLC, Palo Alto, CA (US)

(72) Inventors: Ling Li, Seoul (KR); Xiang Li, Saratoga, CA (US); Shan Liu, Saratoga, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/231,565

(22) Filed: Apr. 15, 2021

(65) Prior Publication Data
US 2021/0368195 A1    Nov. 25, 2021

Related U.S. Application Data

(60) Provisional application No. 63/029,365, filed on May 22, 2020.

(51) Int. Cl.
| | |
|---|---|
| *H04N 19/46* | (2014.01) |
| *H04N 19/172* | (2014.01) |
| *H04N 19/105* | (2014.01) |
| *H04N 19/70* | (2014.01) |

(52) U.S. Cl.
CPC ......... *H04N 19/46* (2014.11); *H04N 19/105* (2014.11); *H04N 19/172* (2014.11); *H04N 19/70* (2014.11)

(58) Field of Classification Search
CPC .... H04N 19/46; H04N 19/105; H04N 19/172; H04N 19/70; H04N 19/188
USPC .................................................. 375/240.26
See application file for complete search history.

(56) References Cited

U.S. PATENT DOCUMENTS

| | | | |
|---|---|---|---|
| 2013/0182755 A1 | 7/2013 | Chen et al. | |
| 2013/0272372 A1 | 10/2013 | Hannuksela et al. | |
| 2015/0010051 A1 | 1/2015 | Chen et al. | |
| 2016/0156915 A1* | 6/2016 | Choi | H04N 19/46 |
| | | | 375/240.08 |
| 2016/0191926 A1 | 6/2016 | Deshpande et al. | |
| 2021/0360289 A1* | 11/2021 | He | H04N 19/172 |
| 2021/0368207 A1* | 11/2021 | Li | H04N 19/103 |
| 2021/0368208 A1* | 11/2021 | Samuelsson | H04N 19/46 |

OTHER PUBLICATIONS

He, et al., On VPS syntax, Joint Video Experts Team (JVET) of ITU-T SG 16 WP 3 and ISO/IEC JTC 1/SC 29/WG 11 18th Meeting: by teleconference, Apr. 15-24, 2020, JVET-R0261 (Year: 2020).*
International Search Report dated Jul. 26, 2021 in International Application No. PCT/US2021/029787.
Written Opinion of the International Searching Authority dated Jul. 26, 2021 in International Application No. PCT/US2021/029787.

* cited by examiner

*Primary Examiner* — Marnie A Matt
(74) *Attorney, Agent, or Firm* — Sughrue Mion, PLLC

(57) ABSTRACT

Systems and methods for decoding are provided. A method includes receiving a bitstream including at least one coded picture, inferring a value of a first identifier of a video parameter set, based on the first identifier of the video parameter set not being in the bitstream, and decoding the at least one coded picture based on the inferring.

20 Claims, 6 Drawing Sheets

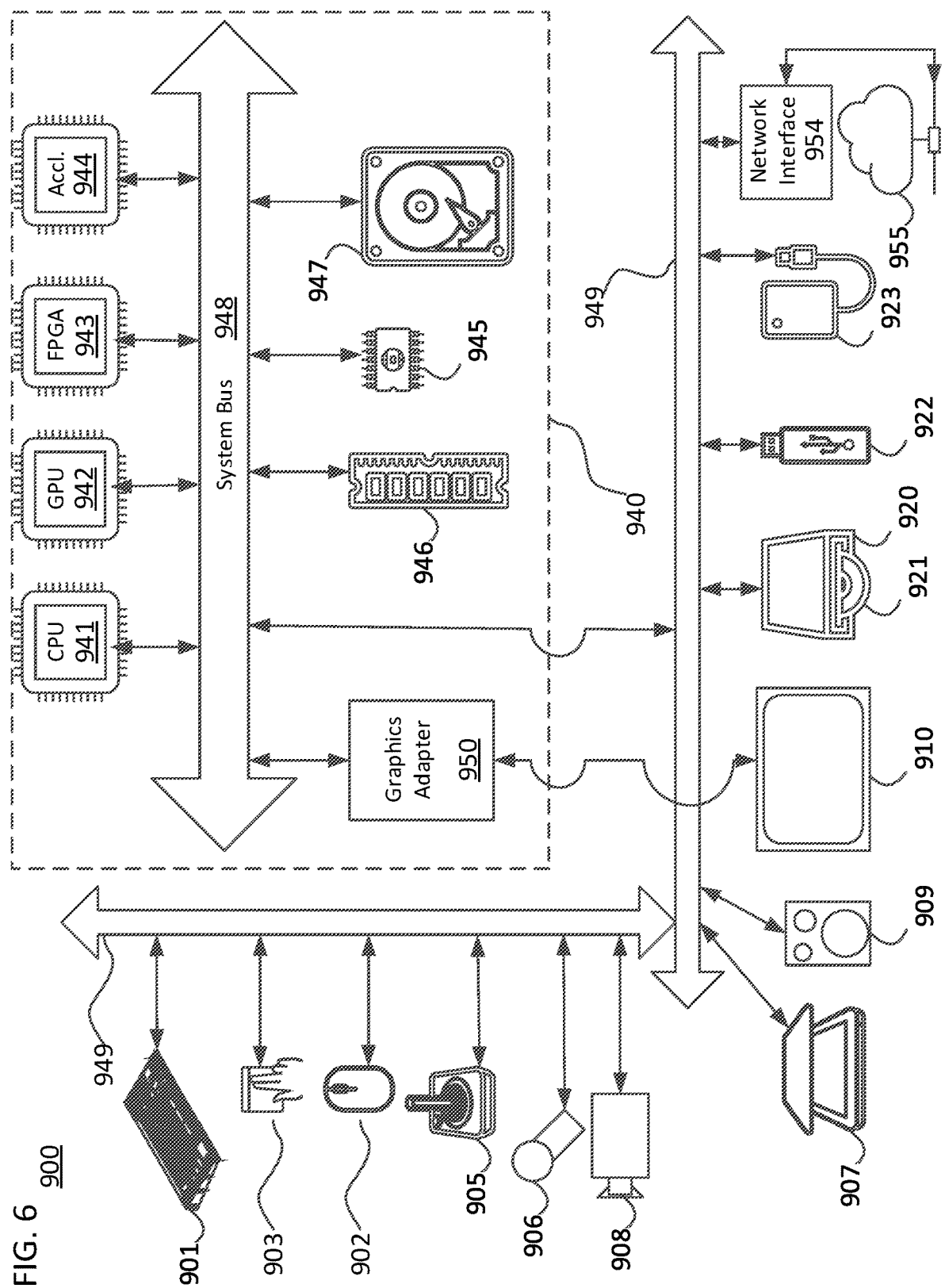

SYSTEMS AND METHODS FOR DECODING BASED ON INFERRED VIDEO PARAMETER SETS

CROSS-REFERENCE TO THE RELATED APPLICATION

This application claims priority from U.S. Provisional Application No. 63/029,365, filed on May 22, 2020, the disclosure of which is incorporated herein by reference in its entirety.

FIELD

Embodiments of the present disclosure are directed to next-generation video coding technologies beyond HEVC (High Efficiency Video Coding), e.g., Versatile Video Coding (VVC). More specifically, embodiments of the present disclosure are directed to systems and methods for decoding based on inferred Video Parameter Sets (VPS).

BACKGROUND

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). In 2015, these two standard organizations jointly formed the Joint Video Exploration Team (JVET) to explore the potential of developing the next video coding standard beyond HEVC. In October 2017, JVET issued the Joint Call for Proposals on Video Compression with Capability beyond HEVC (CfP). By Feb. 15, 2018, a total of 22 CfP responses on standard dynamic range (SDR), 12 CfP responses on high dynamic range (HDR), and 12 CfP responses on 360 video categories were submitted. In April 2018, all received CfP responses were evaluated in the 122nd Moving Picture Experts Group (MPEG)/10th JVET meeting. As a result of this meeting, JVET formally launched the standardization process of next-generation video coding beyond HEVC. The new standard was named Versatile Video Coding (VVC), and JVET was renamed as Joint Video Expert Team. The current version of the VVC Test Model (VTM) is VTM 7.

SUMMARY

According to one or more embodiments, a method performed by at least one processor is provided. The method includes: receiving a bitstream including at least one coded picture; inferring a value of a first identifier of a video parameter set, based on the first identifier of the video parameter set not being in the bitstream; and decoding the at least one coded picture based on the inferring.

According to an embodiment, the inferring comprises inferring the value of the first identifier as 0 based on the first identifier of the video parameter set not being in the bitstream.

According to an embodiment, the value of the first identifier indicates that the video parameter set is not present in the bitstream.

According to an embodiment, the method further includes inferring a value of a second identifier of a layer of the video parameter set based on the first identifier of the video parameter set not being in the bitstream.

According to an embodiment, the inferring the value of the second identifier comprises inferring the value of the second identifier as 0 based on the first identifier of the video parameter set not being in the bitstream.

According to an embodiment, the method further includes inferring a value of a flag based on the flag not being in the bitstream, wherein the flag indicates whether a syntax element is present that indicates whether pictures of a layer, specified by the video parameter set, are used as interlayer reference pictures (ILRPs).

According to an embodiment, inferring the value of the flag comprises inferring the value of the flag as 0 based on the flag not being in the bitstream.

According to an embodiment, the method further includes inferring a value of a syntax element, that indicates an output layer set mode, based on a first flag indicating that all layers specified by the video parameter set are independently coded without using inter-layer prediction, and based on a second flag indicating that each layer in a coded video sequence (CVS), referring to the video parameter set, is an output layer set (OLS) containing only one layer.

According to an embodiment, the inferring the value of the syntax element comprises inferring the value of the syntax element as 0 based on the first flag having a value of 1 and the second flag having a value of 1.

According to an embodiment, the inferring the value of the syntax element comprises inferring the value of the syntax element as a value that indicates the output layer set mode is a mode in which: a total number of OLSs specified by the video parameter set is equal to a total number of the layers specified by the video parameter set, an i-th OLS from among the OLSs includes layers with layer indices from 0 to i, inclusive, and for each OLS from among the OLSs, only a highest layer in the OLS is an output layer.

According to one or more embodiments, a system is provided. The system includes: at least one memory storing computer code; and at least one processor configured to receive a bitstream comprising at least one coded picture. The at least one processor is further configured to access the computer code and operate as instructed by the computer code, the computer code including: inferring code configured to cause the at least one processor to infer a value of a first identifier of a video parameter set, based on the first identifier of the video parameter set not being in the bitstream; and decoding code configured to cause the at least one processor to decode the at least one coded picture based on the inferring.

According to an embodiment, the inferring code is configured to cause the at least one processor to infer the value of the first identifier as 0 based on the first identifier of the video parameter set not being in the bitstream.

According to an embodiment, the value of the first identifier indicates that the video parameter set is not present in the bitstream.

According to an embodiment, the inferring code is further configured to cause the at least one processor to infer a value of a second identifier of a layer of the video parameter set based on the first identifier of the video parameter set not being in the bitstream.

According to an embodiment, the inferring code is configured to cause the at least one processor to infer the value of the second identifier as 0 based on the first identifier of the video parameter set not being in the bitstream.

According to an embodiment, the inferring code is further configured to cause the at least one processor to infer a value of a flag based on the flag not being in the bitstream, and the flag indicates whether a syntax element is present that indicates whether pictures of a layer, specified by the video parameter set, are used as interlayer reference pictures (ILRPs).

According to an embodiment, the inferring code is configured to cause the at least one processor to infer the value of the flag as 0 based on the flag not being in the bitstream.

According to an embodiment, the inferring code is further configured to cause the at least one processor to infer a value of a syntax element, that indicates an output layer set mode, based on a first flag indicating that all layers specified by the video parameter set are independently coded without using inter-layer prediction, and based on a second flag indicating that each layer in a coded video sequence (CVS), referring to the video parameter set, is an output layer set (OLS) containing only one layer.

According to an embodiment, the inferring code is configured to cause the at least one processor to infer the value of the syntax element as 0 based on the first flag having a value of 1 and the second flag having a value of 1.

According to one or more embodiments, a non-transitory computer-readable medium storing computer code is provided. The computer code is configured to, when executed by at least one processor, cause the at least one processor to: infer a value of a first identifier of a video parameter set, based on the first identifier of the video parameter set not being in a received bitstream that includes at least one coded picture; and decode the at least one coded picture based on inferring the value of the first identifier.

BRIEF DESCRIPTION OF THE DRAWINGS

Further features, the nature, and various advantages of the disclosed subject matter will be more apparent from the following detailed description and the accompanying drawings in which:

FIG. 6 is a diagram of a computer system suitable for implementing embodiments.

DETAILED DESCRIPTION

Figure 1:
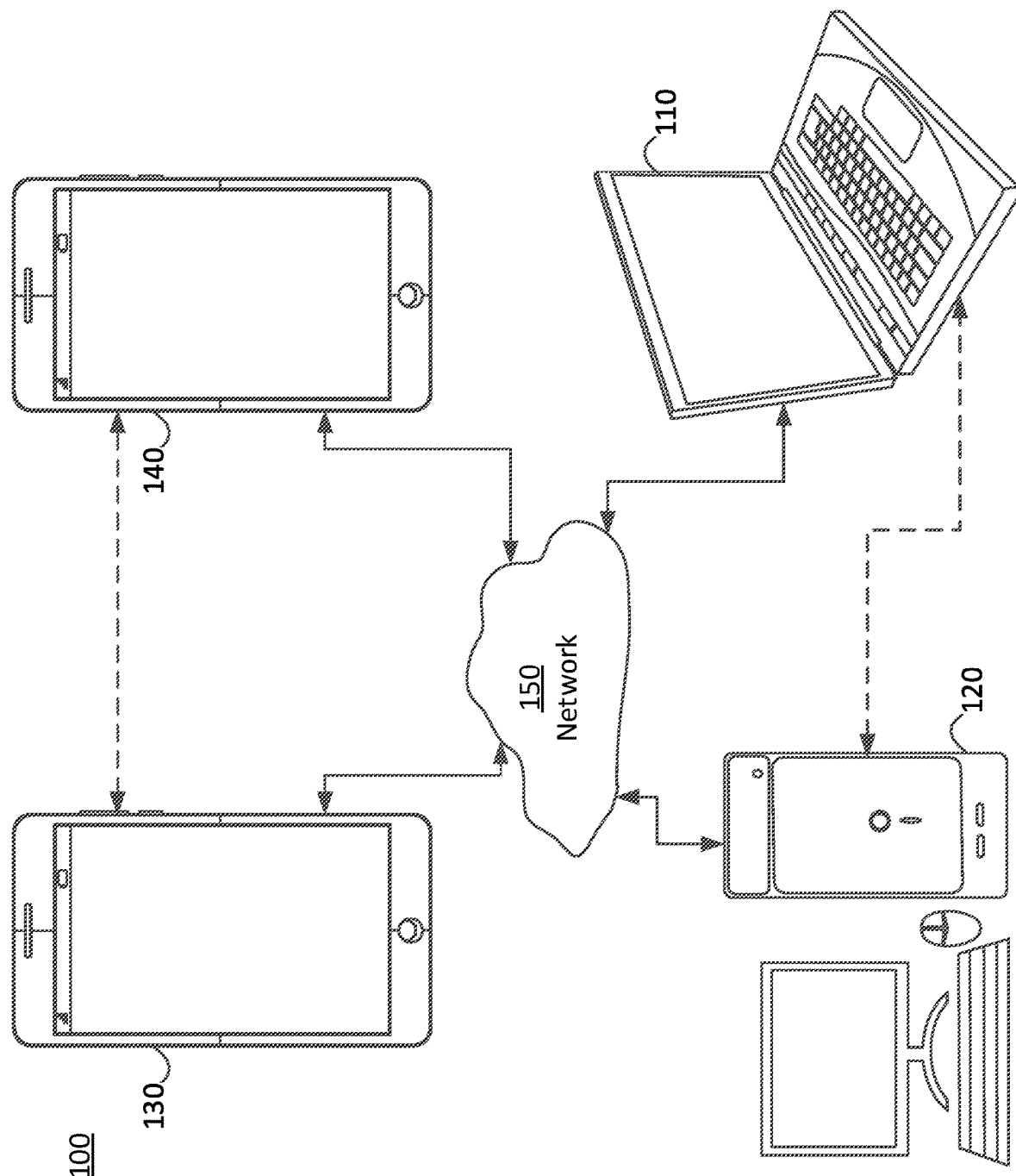
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
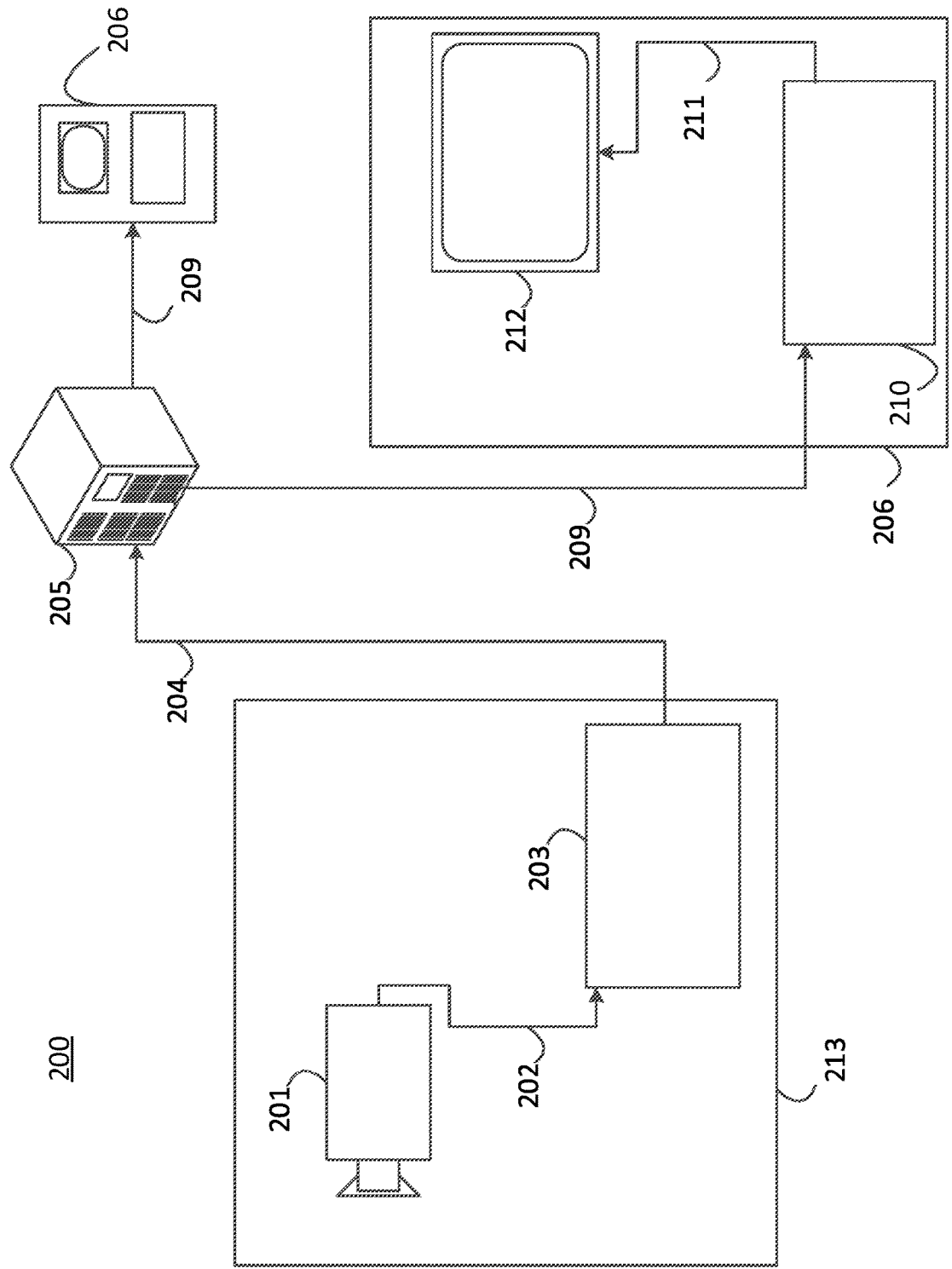
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
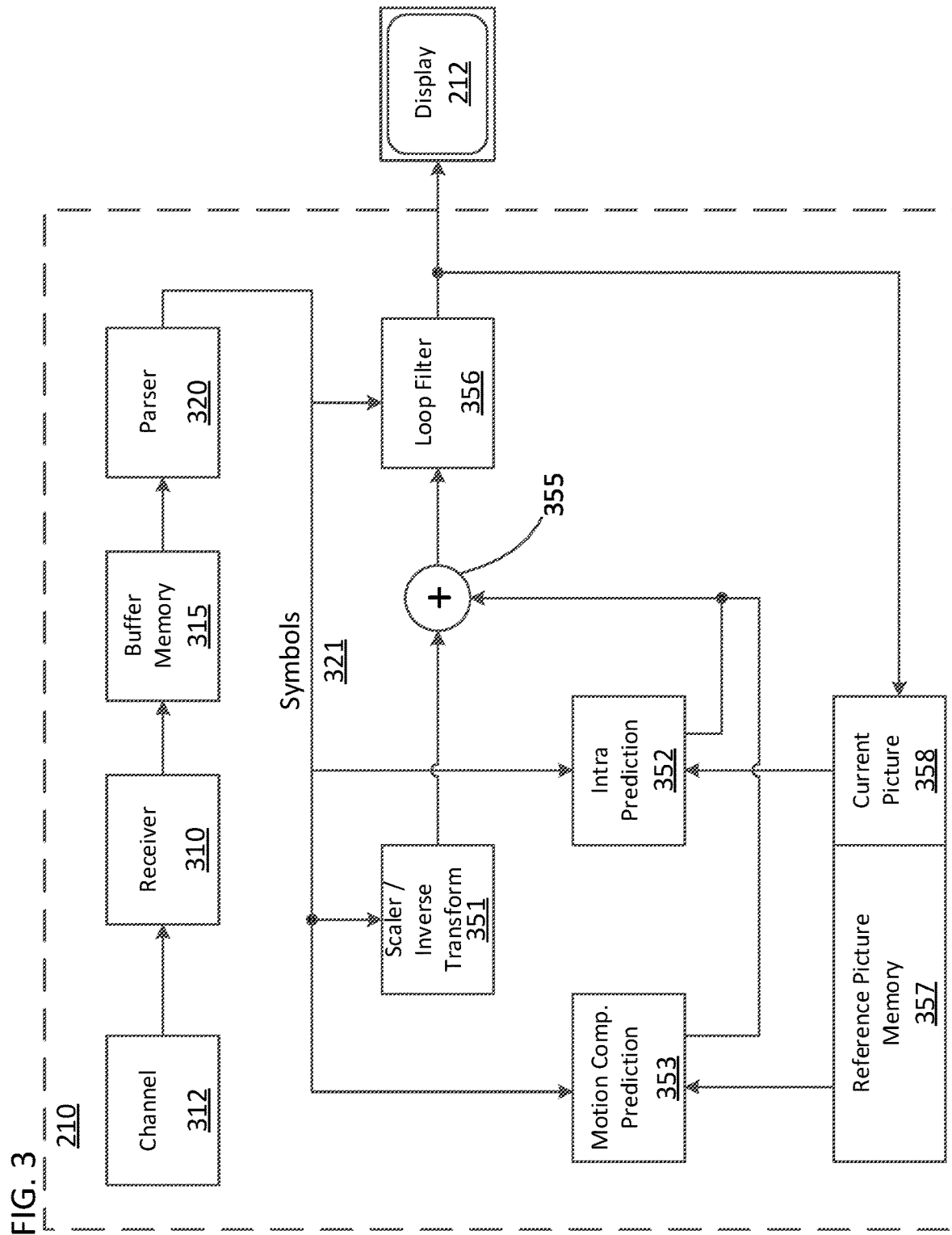
FIG. 3 is a schematic illustration of a simplified block diagram of a decoder in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory 0. In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or can be small. For use on best effort packet networks such as the Internet, the buffer (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
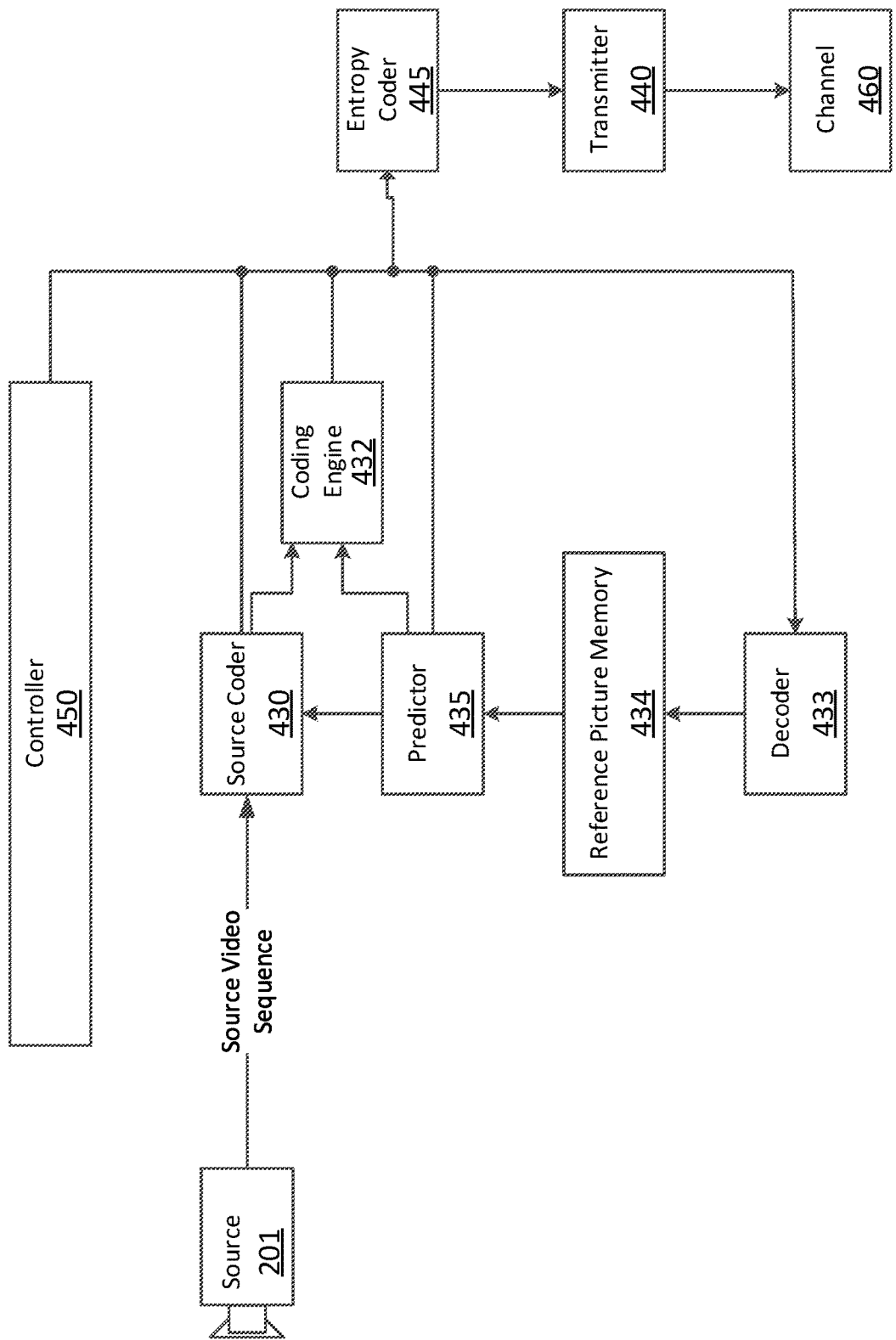
FIG. 4 is a schematic illustration of a simplified block diagram of an encoder in accordance with an embodiment.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . .), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an over-simplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

[1. Video Parameter Set]

In VVC Draft 9, syntax elements in video parameter set (VPS) may be present as shown in TABLE 1 (see end of Detailed Description).

A VPS raw byte sequence payload (RBSP) may be required to be available to the decoding process prior to it being referenced, included in at least one access unit (AU) with TemporalId equal to 0 or provided through external means.

All VPS network abstraction layer (NAL) units with a particular value of vps_video_parameter_set_id in a coded video sequence (CVS) may be required to have the same content.

Syntax element vps_video_parameter_set_id provides an identifier for the VPS for reference by other syntax elements. The value of vps_video_parameter_set_id may be required to be greater than 0.

Syntax element vps_max_layers_minus1 plus 1 specifies the number of layers specified by the VPS, which is the maximum allowed number of layers in each CVS referring to the VPS.

Syntax element vps_max_sublayers_minus1 plus 1 specifies the maximum number of temporal sublayers that may be present in a layer specified by the VPS. The value of vps_max_sublayers_minus1 may be required to be in the range of 0 to 6, inclusive.

Syntax element vps_all_layers_same_num_sublayers_flag equal to 1 specifies that the number of temporal sublayers is the same for all the layers specified by the VPS. Syntax element vps_all_layers_same_num_sublayers_flag equal to 0 specifies that the layers specified by the VPS may or may not have the same number of temporal sublayers. When not present, the value of vps_all_layers_same_num_sublayers_flag may be inferred to be equal to 1.

Syntax element vps_all_independent_layers_flag equal to 1 specifies that all layers specified by the VPS are independently coded without using inter-layer prediction. Syntax element vps_all_independent_layers_flag equal to 0 specifies that one or more of the layers specified by the VPS may use inter-layer prediction. When not present, the value of vps_all_independent_layers_flag may be inferred to be equal to 1.

Syntax element vps_layer_id[i] specifies the nuh_layer_id value of the i-th layer. For any two non-negative integer values of m and n, when m is less than n, the value of vps_layer_id[m] may be required to be less than vps_layer_id[n].

Syntax element vps independent layer flag[i] equal to 1 specifies that the layer with index i does not use inter-layer prediction. Syntax element vps_independent_layer_flag[i] equal to 0 specifies that the layer with index i may use inter-layer prediction and the syntax elements vps_direct_ref_layer_flag[i][j] for j in the range of 0 to i−1, inclusive, are present in VPS. When not present, the value of vps_independent_layer_flag[i] may be inferred to be equal to 1.

Syntax element vps_max_tid_ref_present_flag[i] equal to 1 specifies that the syntax element vps_max_tid_ref_pics_plus1[i][j] is present. Syntax element vps_max_tid_ref_present_flag[i] equal to 0 specifies that the syntax element vps_max_tid_il_ref_pics_plus1[i][j] is not present.

Syntax element vps_direct_ref_layer_flag[i][j] equal to 0 specifies that the layer with index j is not a direct reference layer for the layer with index i. Syntax element vps_direct_ref_layer_flag [i][j] equal to 1 specifies that the layer with index j is a direct reference layer for the layer with index i. When vps_direct_ref_layer_flag[i][j] is not present for i and j in the range of 0 to vps_max_layers_minus1, inclusive, it may be inferred to be equal to 0. When vps_independent_layer_flag[i] is equal to 0, there may be required to be at least one value of j in the range of 0 to i−1, inclusive, such that the value of vps_direct_ref_layer_flag[i][j] is equal to 1.

The variables NumDirectRefLayers[i], DirectRefLayerIdx[i][d], NumRefLayers[i], RefLayerIdx[i][r], and LayerUsedAsRefLayerFlag[j] may be derived as follows:

```
for( i = 0; i <= vps_max_layers_minus1; i++ ) {
    for( j = 0; j <= vps_max_layers_minus1; j++ ) {
        dependencyFlag[ i ][ j ] = vps_direct_ref_layer_flag[ i ][ j ]
        for( k = 0; k < i; k++ )
            if( vps_direct_ref_layer_flag[ i ][ k ] &&
                dependencyFlag[ k ][ j ] )
                    dependencyFlag[ i ][ j ] = 1
    }
    LayerUsedAsRefLayerFlag[ i ] = 0
}
for( i = 0; i <= vps_max_layers_minus1; i++ ) {
    for( j = 0, d = 0, r = 0; j <= vps_max_layers_minus 1; j ++ ) {
        if( vps_direct_ref_layer_flag[ i ][ j ] ) {
            DirectRefLayerIdx[ i ][ d++ ] = j
            LayerUsedAsRefLayerFlag[ j ] = 1
        }
        if( dependencyFlag[ i ][ j ] )
            RefLayerIdx[ i ][ r++ ] = j
    }
    NumDirectRefLayers[ i ] = d
    NumRefLayers[ i ] = r
}
```

The variable GeneralLayerIdx[i], specifying the layer index of the layer with nuh_layer_id equal to vps_layer_id[i], may be derived as follows:

```
for( i = 0; i <= vps_max_layers_minus1; i++ )
    GeneralLayerIdx[ vps_layer_id[ i ] ] = i
```

For any two different values of i and j, both in the range of 0 to vps_max_layers_minus1, inclusive, when dependencyFlag[i][j] equal to 1, it may be a requirement of bitstream conformance that the values of sps_chroma_format_idc and sps_bit_depth_minus8 that apply to the i-th layer shall be equal to the values of sps_chroma_format_idc and sps_bit_depth_minus8, respectively, that apply to the j-th layer.

Syntax element vps_max_tid_it_ref_pics_plus1[i][j] equal to 0 specifies that the pictures of the j-th layer that are neither intra random access point (TRAP) pictures nor gradual decoder refresh (GDR) pictures with ph_recovery_poc_cnt equal to 0 are not used as inter-layer reference pictures (ILRPs) for decoding of pictures of the i-th layer. Syntax element vps_max_tid_ref_pics_plus1[i][j] greater than 0 specifies that, for decoding pictures of the i-th layer, no picture from the j-th layer with TemporalId greater than vps_max_tid_il_ref_pics_plus1[i][j]−1 is used as ILRP. When not present, the value of vps_max_tid_il_ref_pics_plus1[i][j] may be inferred to be equal to vps_max_sublayers_minus1+1.

Syntax element vps_each_layer_is_an_ols_flag equal to 1 specifies that each output layer set (OLS) contains only one layer and each layer itself in a CVS referring to the VPS is an OLS with the single included layer being the only output layer. Syntax element vps_each_layer_is_an_ols_flag equal to 0 that at least one OLS contains more than one layer. If vps_max_layers_minus1 is equal to 0, the value of vps_each_layer_is_an_ols_flag may be inferred to be equal to 1. Otherwise, when vps_all_independent_layers_flag is equal to 0, the value of vps_each_layer_is_an_ols_flag may be inferred to be equal to 0.

Syntax element vps_ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is an output layer.

Syntax element vps_ols_mode_idc equal to 1 specifies that the total number of OLSs specified by the VPS is equal to vps_max_layers_minus1+1, the i-th OLS includes the layers with layer indices from 0 to i, inclusive, and for each OLS all layers in the OLS are output layers.

Syntax element vps_ols_mode_idc equal to 2 specifies that the total number of OLSs specified by the VPS is explicitly signalled and for each OLS the output layers are explicitly signalled and other layers are the layers that are direct or indirect reference layers of the output layers of the OLS.

The value of vps_ols_mode_idc may be required to be in the range of 0 to 2, inclusive. The value 3 of vps_ols_mode_idc may be reserved for future use by ITU-T|ISO/IEC.

When vps_all_independent_layers_flag is equal to 1 and vps_each_layer_is_an_ols_flag is equal to 0, the value of vps_ols_mode_idc may be inferred to be equal to 2.

Syntax element vps_num_output_layer_sets_minus1 plus 1 specifies the total number of OLSs specified by the VPS when vps_ols_mode_idc is equal to 2.

The variable TotalNumOlss, specifying the total number of OLSs specified by the VPS, may be derived as follows:

```
if( vps_max_layers_minus1 = = 0 )
    TotalNumOlss = 1
else if( vps_each_layer_is_an_ols_flag | |
vps_ols_mode_idc = = 0 | | vps_ols_mode_idc = = 1 )
    TotalNumOlss = vps_max_layers_minus1 + 1
else if( vps_ols_mode_idc = = 2 )
    TotalNumOlss = vps_num_output_layer_sets_minus1 + 1
```

Syntax element vps_ols_output_layer_flag[i][j] equal to 1 specifies that the layer with nuh_layer_id equal to vps_layer_id[j] is an output layer of the i-th OLS when vps_ols_mode_idc is equal to 2. Syntax element vps_ols_output_layer_flag[i][j] equal to 0 specifies that the layer with nuh_layer_id equal to vps_layer_id[j] is not an output layer of the i-th OLS when vps_ols_mode_idc is equal to 2.

The variable NumOutputLayersInOls[i], specifying the number of output layers in the i-th OLS, the variable NumSubLayersInLayerinOLS[i][j], specifying the number of sublayers in the j-th layer in the i-th OLS, the variable OutputLayerIdInOls[i][j], specifying the nuh_layer_id value of the j-th output layer in the i-th OLS, and the variable LayerUsedAsOutputLayerFlag[k], specifying whether the k-th layer is used as an output layer in at least one OLS, may be derived as follows:

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] =
vps_max_sublayers_minus1 + 1
LayerUsedAsOutputLayerFlag[ 0 ] = 1
for( i = 1, i <= vps_max_layers_minus1; i++ ) {
    if( vps_each_layer_is_an_ols_flag | | vps_ols_mode_idc < 2 )
        LayerUsedAsOutputLayerFlag[ i ] = 1
    else /*( !vps_each_layer_is_an_ols_flag &&
        vps_ols_mode_idc = = 2 ) */
        LayerUsedAsOutputLayerFlag[ i ] = 0
}
for( i = 1; i < TotalNumOlss; i++ )
    if( vps_each_layer_is_an_ols_flag | | vps_ols_mode_idc = =
0 ) {
        NumOutputLayersInOls[ i ] = 1
        OutputLayerIdInOls[ i ][ 0 ] = vps_layer_id[ i ]
        if( vps_each_layer_is_an_ols_flag )
            NumSubLayersInLayerInOLS[ i ][ 0 ] =
            vps_max_sublayers_minus1 + 1
        else {
            NumSubLayersInLayerInOLS[ i ][ i ] =
            vps_max_sublayers_minus1 + 1
            for( k = i - 1, k >= 0; k- - ) {
```

```
                NumSubLayersInLayerInOLS[ i ][ k ] = 0
                for( m = k + 1; m <= i; m++ ) {
                    maxSublayerNeeded = min(
                    NumSubLayersInLayerInOLS[ i ][ m ],
                        vps_max_tid_il_ref_pics_plus1[ m ][ k ] )
                    if( vps_direct_ref_layer_flag[ m ][ k ] &&
                        NumSubLayersInLayerInOLS[ i ][ k ] <
                        maxSublayerNeeded )
                        NumSubLayersInLayerInOLS[ i ][ k ] =
                        maxSublayerNeeded
                }
            }
        }
    } else if( vps_ols_mode_idc = = 1 ) {
        NumOutputLayersInOls[ i ] = i + 1
        for( j = 0; j < NumOutputLayersInOls[ i ]; j++ ) {
            OutputLayerIdInOls[ i ][ j ] = vps_layer_id[ j ]
            NumSubLayersInLayerInOLS[ i ][ j ] =
            vps_max_sublayers_minus1 + 1
        }
    } else if( vps_ols_mode_idc = = 2 ) {
        for( j = 0; j <= vps_max_layers_minus1; j++ ) {
            layerIncludedInOlsFlag[ i ][ j ] = 0
            NumSubLayersInLayerInOLS[ i ][ j ] = 0
        }
        highestIncludedLayer = 0
        numLayerInOls = 0
        for( k = 0, j = 0; k <= vps_max_layers_minus1; k++ )
            if( vps_ols_output_layer_flag[ i ][ k ] ) {
                layerIncludedInOlsFlag[ i ][ k ] = 1
                highestIncludedLayer = k
                numLayerInOls++
                LayerUsedAsOutputLayerFlag[ k ] = 1
                Output LayerIdx[ i ][ j ] = k
                OutputLayerIdInOls[ i ][ j++ ] = vps_layer_id[ k ]
                NumSubLayersInLayerInOLS[ i ][ k ] =
                vps_max_sublayers_minus1 + 1
            }
        NumOutputLayersInOls[ i ] = j
        for( j = 0; j < NumOutputLayersInOls[ i ]; j++ ) {
            idx = OutputLayerIdx[ i ][ j ]
            for( k = 0; k < NumRefLayers[ idx ]; k++ ) {
                if (!layerIncludedInOlsFlag[ i ][ RefLayerIdx[ idx ][ k ] ] )
                    numLayerInOls++
                layerIncludedInOlsFlag[ i ][ RefLayerIdx[ idx ][ k ] ] = 1
            }
        }
        for( k = highestIncludedLayer - 1; k >= 0; k- - )
            if( layerIncludedInOlsFlag[ i ][ k ] &&
                !vps_ols_output_layer_flag[ i ][ k ] )
                for( m = k + 1; m <= highestIncludedLayer; m++ ) {
                    maxSublayerNeeded = min(
                    NumSubLayersInLayerInOLS[ i ][ m ],
                        vps_max_tid_il_ref_pics_plus1[ m ][ k ] )
                    if( vps_direct_ref_layer_flag[ m ][ k ] &&
layerIncludedInOlsFlag[ i ][ m ] &&
                        NumSubLayersInLayerInOLS[ i ][ k ] <
                        maxSublayerNeeded )
                        NumSubLayersInLayerInOLS[ i ][ k ] =
                        maxSublayerNeeded
                }
    }
```

For each value of i in the range of 0 to vps_max_layers_minus1, inclusive, the values of LayerUsedAsRefLayerFlag[i] and LayerUsedAsOutputLayerFlag[i] may be required to not be both equal to 0. In other words, there may be required to be no layer that is neither an output layer of at least one OLS nor a direct reference layer of any other layer.

For each OLS, there may be required to be at least one layer that is an output layer. In other words, for any value of i in the range of 0 to TotalNumOlss−1, inclusive, the value of NumOutputLayersInOls[i] may be required to be greater than or equal to 1.

The variable NumLayersInOls[i], specifying the number of layers in the i-th OLS, the variable LayerIdInOls[i][j], specifying the nuh_layer_id value of the j-th layer in the i-th OLS, the variable NumMultiLayerOlss, specifying the number of multi-layer OLSs (i.e., OLSs that contain more than one layer), and the variable MultiLayerOlsIdx[i], specifying the index to the list of multi-layer OLSs for the i-th OLS when NumLayersInOls[i] is greater than 0, may be derived as follows:

```
NumLayersInOls[ 0 ] = 1
LayerIdInOls[ 0 ][ 0 ] = vps_layer_id[ 0 ]
NumMultiLayerOlss = 0
for( i = 1; i < TotalNumOlss; i++ ) {
    if( vps_each_layer_is_an_ols_flag ) {
        NumLayersInOls[ i ] = 1
        LayerIdInOls[ i ][ 0 ] = vps_layer_id[ i ]
    } else if( vps_ols_mode_idc = = 0 | | vps_ols_mode_idc = = 1 ) {
        NumLayersInOls[ i ] = i + 1
        for( j = 0; j < NumLayersInOls[ i ]; j++ )
            LayerIdInOls[ i ][ j ] = vps_layer_id[ j ]
    } else if( vps_ols_mode_idc = = 2 ) {
        for( k = 0, j = 0; k <= vps_max_layers_minus1; k++ )
            if( layerIncludedInOlsFlag[ i ][ k ] )
                LayerIdInOls[ i ][ j++ ] = vps_layer_id[ k ]
        NumLayersInOls[ i ] = j
    }
    if( NumLayersInOls[ i ] > 1 ) {
        MultiLayerOlsIdx[ i ] = NumMultiLayerOlss
        NumMultiLayerOlss++
    }
}
```

According to embodiments, the 0-th OLS contains only the lowest layer (i.e., the layer with nuh_layer_id equal to vps_layer_id[0]) and for the 0-th OLS the only included layer is output.

The variable OlsLayerIdx[i][j], specifying the OLS layer index of the layer with nuh_layer_id equal to LayerIdInOls [i][j], may be derived as follows:

```
for( i = 0; i < TotalNumOlss; i++ )
    for j = 0; j <NumLayersInOls[ i ]; j++ )
        OlsLayerIdx[ i ][ LayerIdInOls[ i ][ j ] ] = j
```

The lowest layer in each OLS may be required to be an independent layer. In other words, for each i in the range of 0 to TotalNumOlss−1, inclusive, the value of vps_independent_layer_flag[GeneralLayerIdx[LayerIdInOls[i][0]]] may be required to be equal to 1.

Each layer may be required to be included in at least one OLS specified by the VPS. In other words, for each layer with a particular value of nuh_layer_id, nuhLayerId equal to one of vps_layer_id[k] fork in the range of 0 to vps_max_layers_minus1, inclusive, there may be required to be at least one pair of values of i and j, where i is in the range of 0 to TotalNumOlss−1, inclusive, and j is in the range of NumLayersInOls[i]−1, inclusive, such that the value of LayerIdInOls [i][j] is equal to nuhLayerId.

Syntax element vps_num_ptls_minus' plus 1 specifies the number of profile_tier_level( ) syntax structures in the VPS. The value of vps_num_ptls_minus' may be required to be less than TotalNumOlss.

Syntax element vps_pt_present_flag[i] equal to 1 specifies that profile, tier, and general constraints information are present in the i-th profile_tier_level( ) syntax structure in the VPS. vps_pt_present_flag[i] equal to 0 specifies that profile, tier, and general constraints information are not present in the i-th profile_tier_level( ) syntax structure in the VPS. The value of vps_pt_present_flag[0] may be inferred to be equal to 1. When vps_pt_present_flag[i] is equal to 0, the profile, tier, and general constraints information for the i-th profile_tier_level( ) syntax structure in the VPS may be inferred to be the same as that for the (i−1)-th profile_tier_level( ) syntax structure in the VPS.

Syntax element vps_ptl_max_temporal_id[i] specifies the TemporalId of the highest sublayer representation for which the level information is present in the i-th profile_tier_level ( ) syntax structure in the VPS. The value of vps_ptl_temporal_id[i] may be required to be in the range of 0 to vps_max_sublayers_minus1, inclusive. When not present, the value of vps_ptl_max_temporal_id[i] may be inferred to be equal to vps_max_sublayers_minus1.

Syntax element vps_ptl_alignment_zero_bit may be required to be equal to 0.

Syntax element vps_ols_ptl_idx[i] specifies the index, to the list of profile_tier_level( ) syntax structures in the VPS, of the profile_tier_level( ) syntax structure that applies to the i-th OLS. When present, the value of vps_ols_ptl_idx[i] may be required to be in the range of 0 to vps_num_ptls_minus1, inclusive.

When not present, the value of vps_ols_ptl_idx[i] may be inferred as follows: If vps_num_ptls_minus1 is equal to 0, the value of vps_ols_ptl_idx[i] may be inferred to be equal to 0. Otherwise (vps_num_ptls_minus' is greater than 0 and vps_num_ptls_minus1+1 is equal to TotalNumOlss), the value of vps_ols_ptl_idx[i] may be inferred to be equal to i.

When NumLayersInOls[i] is equal to 1, the profile_tier_ level( ) syntax structure that applies to the i-th OLS is also present in the SPS referred to by the layer in the i-th OLS. It may be a requirement of bitstream conformance that, when NumLayersInOls[i] is equal to 1, the profile_tier_level ( ) syntax structures signalled in the VPS and in the SPS for the i-th OLS shall be identical.

Each profile_tier_level( ) syntax structure in the VPS may be required to be referred to by at least one value of vps_ols_ptl_idx[i] for i in the range of 0 to TotalNumOlss−1, inclusive.

Syntax element vps_num_dpb_params_minus1 plus 1, when present, specifies the number of dpb_parameters( ) syntax strutcures in the VPS. The value of vps_num_dpb_params_minus1 may be required to be in the range of 0 to NumMultiLayerOlss−1, inclusive.

The variable VpsNumDpbParams, specifying the number of dpb_parameters( ) syntax strutcures in the VPS, may be derived as follows:

```
if( vps_each_layer_is_an_ols_flag )
    VpsNumDpbParams = 0
else
    VpsNumDpbParams = vps_num_dpb_params_minus1 + 1
```

Syntax element vps_sublayer_dpb_params_present_flag is used to control the presence of max_dec_pic_buffering_ minus1[ ], max_num_reorder_pics[ ], and max_latency_increase_plus1[ ] syntax elements in the dpb_parameters( ) syntax strucures in the VPS. When not present, vps_sub_dpb_params_info_present_flag may be inferred to be equal to 0.

Syntax element vps_dpb_max_temporal_id[i] specifies the TemporalId of the highest sublayer representation for which the DPB parameters may be present in the i-th dpb_parameters( ) syntax strutcure in the VPS. The value of vps_dpb_max temporal_id[i] may be required to be in the range of 0 to vps_max_sublayers_minus1, inclusive. When not present, the value of vps_dpb_max_temporal_id[i] may be inferred to be equal to vps_max_sublayers_minus1.

Syntax element vps_ols_dpb_pic_width[i] specifies the width, in units of luma samples, of each picture storage buffer for the i-th multi-layer OLS.

Syntax element vps_ols_dpb_pic_height[i] specifies the height, in units of luma samples, of each picture storage buffer for the i-th multi-layer OLS.

Syntax element vps_ols_dpb_chroma_format[i] specifies the greatest allowed value of sps_chroma_format_idc for all SPSs that are referred to by CLVSs in the CVS for the i-th multi-layer OLS.

Syntax element vps_ols_dpb_bitdepth_minus8[i] specifies the greatest allowed value of sps_bit_depth_minus8 for all SPSs that are referred to by CLVSs in the CVS for the i-th multi-layer OLS.

According to embodiments, for decoding the i-th multi-layer OLS, the deoder can safely allocate memory for the DPB according to the values of the syntax elements vps_ols_dpb_pic_width[i], vps_ols_dpb_pic_height[i], vps_ols_dpb_chroma_format[i], and vps_ols_dpb_bitdepth_minus8[i].

Syntax element vps_ols_dpb_params_idx[i] specifies the index, to the list of dpb_parameters( ) syntax structures in the VPS, of the dpb_parameters( ) syntax structure that applies to the i-th multi-layer OLS. When present, the value of vps_ols_dpb_params_idx[i] may be required to be in the range of 0 to VpsNumDpbParams−1, inclusive.

When vps_ols_dpb_params_idx[i] is not present, it may be inferred as follows: If VpsNumDpbParams is equal to 1, the value of vps_ols_dpb_params_idx[i] may be inferred to be equal to 0. Otherwise (VpsNumDpbParams is greater than 1 and equal to NumMultiLayerOlss), the value of vps_ols_dpb_params_idx[i] may be inferred to be equal to i.

For a single-layer OLS, the applicable dpb_parameters( ) syntax structure is present in the SPS referred to by the layer in the OLS.

Each dpb_parameters( ) syntax structure in the VPS may be required to be referred to by at least one value of vps_ols_dpb_params_idx[i] for i in the range of 0 to NumMultiLayerOlss−1, inclusive.

Syntax element vps_general_hrd_params_present_flag equal to 1 specifies that the VPS contains a general_hrd_parameters( ) syntax structure and other HRD parameters. Syntax element vps_general_hrd_params_present_flag equal to 0 specifies that the VPS does not contain a general_hrd_parameters( ) syntax structure or other HRD parameters.

When NumLayersInOls[i] is equal to 1, the general_hrd_parameters( ) syntax structure and the ols_hrd_parameters( ) syntax structure that apply to the i-th OLS are present in the SPS referred to by the layer in the i-th OLS.

Syntax element vps_sublayer_cpb_params_present_flag equal to 1 specifies that the i-th ols_hrd_parameters( ) syntax structure in the VPS contains HRD parameters for the sublayer representations with TemporalId in the range of 0 to vps_hrd_max tid[i], inclusive. Syntax element vps_sublayer_cpb_params_present_flag equal to 0 specifies that the i-th ols_hrd_parameters( ) syntax structure in the VPS contains HRD parameters for the sublayer representation with TemporalId equal to vps_hrd_max_tid[i] only. When vps_max_sublayers_minus1 is equal to 0, the value of vps_sublayer_cpb_params_present_flag may be inferred to be equal to 0.

When vps_sublayer_cpb_params_present_flag is equal to 0, the HRD parameters for the sublayer representations with TemporalId in the range of 0 to vps_hrd_max_tid[i]−1, inclusive, may be inferred to be the same as that for the sublayer representation with TemporalId equal to vps_hrd_max_tid[i]. These include the HRD parameters starting from the fixed_pic_rate_general_flag[i] syntax element till the sublayer_hrd_parameters(i) syntax structure immediately under the condition "if(general_vcl hrd_params_present_flag)" in the ols_hrd_parameters syntax structure.

Syntax element vps_num_ols_hrd_params_minus1 plus 1 specifies the number of ols_hrd_parameters( ) syntax structures present in the VPS when vps_general_hrd_params_present_flag is equal to 1. The value of vps_num_ols_hrd_params_minus1 may be required to be in the range of 0 to NumMultiLayerOlss−1, inclusive.

Syntax element vps_hrd_max_tid[i] specifies the TemporalId of the highest sublayer representation for which the HRD parameters are contained in the i-th ols_hrd_parameters( ) syntax structure. The value of vps hrd_max_tid[i] may be required to be in the range of 0 to vps_max_sublayers_minus1, inclusive. When not present, the value of vps_hrd_max_tid[i] may be inferred to be equal to vps_max_sublayers_minus1.

Syntax element vps_ols_hrd_idx[i] specifies the index, to the list of ols_hrd_parameters( ) syntax structures in the VPS, of the ols_hrd_parameters( ) syntax structure that applies to the i-th multi-layer OLS. The value of vps_ols_hrd_idx[i] may be required to be in the range of 0 to vps num_ols_hrd_params_minus1, inclusive.

When vps_ols_hrd_idx[i] is not present, it may be inferred as follows: If vps_num_ols_hrd_params_minus1 is equal to 0, the value of vps_ols_hrd_idx[[i] may be inferred to be equal to 0. Otherwise (vps_num_ols_hrd_params_minus1+1 is greater than 1 and equal to NumMultiLayerOlss), the value of vps_ols_hrd_idx[i] may be inferred to be equal to i.

For a single-layer OLS, the applicable ols_hrd_parameters( ) syntax structure is present in the SPS referred to by the layer in the OLS.

Each ols_hrd_parameters( ) syntax structure in the VPS may be required to be referred to by at least one value of vps_ols_hrd_idx[i] for i in the range of 1 to NumMultiLayerOlss−1, inclusive.

Syntax element vps_extension_flag equal to 0 specifies that no vps_extension_data_flag syntax elements are present in the VPS RBSP syntax structure. Syntax element vps_extension_flag equal to 1 specifies that there are vps_extension_data_flag syntax elements present in the VPS RBSP syntax structure.

Syntax element vps_extension_data_flag may have any value. Its presence and value may not affect decoder conformance to profiles specified in some embodiments. Decoders conforming to some embodiments may ignore all vps_extension_data_flag syntax elements.

[2. Sequence Parameter Set]

In VVC Draft 8, syntax elements in sequence parameter set (SPS) may be provided as shown in TABLE 2 (see end of Detailed Description). Such syntax elements may relate to intra coding and inter coding. Compared to HEVC, a larger amount of syntax elements is present in SPS. It is noted that for any intra profiles which only consists of intra slices, inter coding syntax elements may not be used for decoding process. The situation may be the same with any still picture profiles.

3. Example Embodiments

Embodiments of the present disclosure may be used separately or combined in any order. Further, each of the embodiments (e.g. methods, encoders, and decoders) may be implemented by processing circuitry (e.g., one or more processors or one or more integrated circuits). In one example, the one or more processors execute a program that is stored in a non-transitory computer-readable medium. Embodiments of the present disclosure may implement aspects (e.g. VPS and SPS) as described above. Embodiments of the present disclosure may also implement the following aspects.

Aspect 1: Embodiments of the present disclosure may have different ranges of values of an vps_video_parameter_set_id syntax element. The range of values of vps_video_parameter_set_id may depend on the presence of vps_video_parameter_set id in bitstream. When a bitstream only has a single layer, VPS may not be present in that bitstream and vps_video_parameter_set_id may be required to be equal to 0.

Syntax element vps_video_parameter_set_id provides an identifier for the VPS for reference by other syntax elements. When vps_video_parameter_set_id is present, the value range of vps_video_parameter_set id may be required to be greater than 0. When not present or sps_video_parameter_set_id equals to 0, the value of vps_video_parameter_set_id may be inferred to be 0.

Aspect 2: When a bitstream only has a single layer, VPS may not be present in that bitstream and vps_max_sublayers_minus1 may be required to be equal to 0. According to embodiments, vps_layer_id [0] may be inferred as value 0 when VPS is not present.

Syntax element vps_layer_id[i] specifies the nuh_layer_id value of the i-th layer. For any two non-negative integer values of m and n, when m is less than n, the value of vps_layer_id[m] may be required to be less than vps_layer_id[n]. When not present, vps_layer_id [0] may be inferred to be 0.

Aspect 3: Embodiments of the present disclosure may have a default value for vps_max_tid_ref_present_flag[i] where i has range from 0 to vps_max_layers_minus1. The default value for vps_max_tid_ref_present_flag[i] may be 0 for all i. For any k where k is in a range from 0 to vps_max_layers_minus1, the signaled value of vps_max_tid_ref_present_flag[k] may overwrite the default value 0.

Syntax element vps_max_tid_ref_present_flag[i] equal to 1 specifies that the syntax element vps_max_tid_il_ref_pics_plus1[i][j] is present. Syntax element vps_max_tid_ref_present_flag[i] equal to 0 specifies that the syntax element vps_max_tid_il_ref_pics_plus1[i][j] is not present. When vps_max_tid_ref_present_flag[i] is not present, the value of vps_max_tid_ref_present_flag[i] may be inferred to be 0.

Aspect 4: Embodiments of the present disclosure may infer the value for vps_ols_mode_idc when vps_all_independent_layers_flag is equal to 1 and vps_each_layer_is_an_ols_flag is equal to 1.

Aspect 4.1: In one embodiment, the inferred value of vps_ols_mode_idc is 0 when vps_all_independent_layers_flag is equal to 1 and vps_each_layer_is_an_ols flag is equal to 1.

Syntax element vps_ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is an output layer.

Syntax element vps_ols_mode_idc equal to 1 specifies that the total number of OLSs specified by the VPS is equal to vps_max_layers_minus1+1, the i-th OLS includes the layers with layer indices from 0 to i, inclusive, and for each OLS all layers in the OLS are output layers.

Syntax element vps_ols_mode_idc equal to 2 specifies that the total number of OLSs specified by the VPS is explicitly signalled and for each OLS the output layers are explicitly signalled and other layers are the layers that are direct or indirect reference layers of the output layers of the OLS.

The value of vps_ols_mode_idc may be required to be in the range of 0 to 2, inclusive. The value 3 of vps_ols_mode_idc may be reserved for future use by ITU-T|ISO/IEC.

When vps_all_independent_layers_flag is equal to 1 and vps_each_layer_is_an_ols_flag is equal to 0, the value of vps_ols_mode_idc may be inferred to be equal to 2. When vps_all_independent_layers_flag is equal to 1 and vps_each_layer_is_an_ols_flag is equal to 1, the value of vps_ols_mode_idc may be inferred to be equal to 0.

4. Example Computer Code

Embodiments of the present disclosure may comprise at least one processor and memory storing computer code. The computer code, when executed by the at least one processor, may be configured to cause the at least one processor to perform the functions of the embodiments of the present disclosure.

Figure 5:
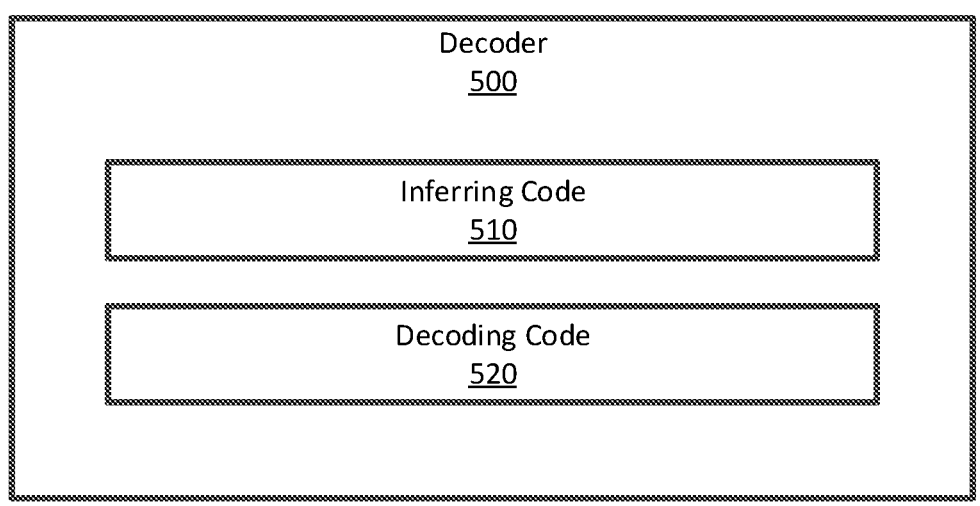
FIG. 5 is a block diagram of computer code according to embodiments.

For example, with reference to FIG. 5, a decoder (500) of the present disclosure may comprise at least one processor and memory storing computer code. The computer instructions may comprise inferring code (510), and decoding code (520). The decoder (500) may implement the video decoder (210) illustrated in FIGS. 2-3. The decoder (500) may be configured to receive a bitstream including at least one coded picture and parameter sets (e.g., SPS and VPS).

The inferring code (510) may be configured to cause the at least one processor to infer values of syntax elements in accordance with, for example, one or more of aspects 1-4.1 of subsection 3 ("Example Embodiments") of the present disclosure. The at least one processor may infer the values based on determining whether conditions, as described in the present disclosure, are met. For example, the at least one processor may infer the value of vps_video_parameter_set_id based on determining that vps_video_parameter_set_id is not provided in the bitstream. Alternatively or additionally, the at least one processor may infer values of other syntax elements based on the above determination and/or other determinations of conditions, as described in the present disclosure.

The decoding code (520) may be configured to cause the at least one processor to decode the at least one coded picture based on one or more of the inferred syntax elements of aspects 1-4.1 of subsection 3 ("Example Embodiments") of the present disclosure.

The techniques of embodiments of the present disclosure described above, can be implemented as computer software using computer-readable instructions and physically stored in one or more computer-readable media. For example, FIG. 6 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 6 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter 950 may be included in the core 940.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hard-wired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (I)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

[tables]

TABLE 1

| Video parameter set RBSP syntax | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         vps_max_tid_ref_present_flag[ i ] | u(1) |
|         for( j = 0; j < i; j++ ) { | |
|           vps_direct_ref_layer_flag[ i ][ j ] | u(1) |
|           if( vps_max_tid_ref_present_flag[ i ] && vps_direct_ref_layer_flag[ i ][ j ] ) | |
|             vps_max_tid_il_ref_pics_plus1[ i ][ j ] | u(3) |
|         } | |
|       } | |
|     } | |
|   } | |
|   if( vps_max_layers_minus1 > 0 ) { | |
|     if( vps_all_independent_layer_flag ) | |
|       vps_each_layer_is_an_ols_flag | u(1) |
|     if( !vps_each_layer_is_an_ols_flag ) { | |
|       if( !vps_all_independent_layers_flag ) | |
|         vps_ols_mode_idc | u(2) |
|       if( vps_ols_mode_idc = = 2 ) { | |
|         vps_num_output_layer_sets_minus1 | u(8) |
|         for( i = 1; i <= vps_num_output_layer_sets_minus1; i ++) | |
|           for( j = 0; j <= vps_max_layers_minus1; j++ ) | |
|             vps_ols_output_layer_flag[ i ][ j ] | u(1) |
|       } | |
|     } | |
|   } | |
|   vps_num_ptls_minus1 | u(8) |
|   for( i = 0; i <= vps_num_ptls_minus1; i++ ) { | |
|     if( i > 0 ) | |
|       vps_pt_present_flag[ i ] | u(1) |
|     if( !vps_all_layers_same_num_sublayers_flag ) | |
|       vps_ptl_max_temporal_id[ i ] | u(3) |
|   } | |
|   while( !byte_aligned( ) ) | |
|     vps_ptl_alignment_zero_bit /* equal to 0 */ | f(1) |
|   for( i = 0; i <= vps_num_ptls_minus1; i++ ) | |
|     profile_tier_level( vps_pt_present_flag[ i ], vps_ptl_max_temporal_id[ i ] ) | |
| ) | |

TABLE 1-continued

Video parameter set RBSP syntax

|  | Descriptor |
|---|---|
|     for( i = 0; i < TotalNumOlss; i++ ) | |
|         if( vps_num_ptls_minus1 > 0 && vps_num_ptls_minus1 + 1 != TotalNumOlss ) | |
|             vps_ols_ptl_idx[ i ] | u(8) |
|     if( !vps_each_layer_is_an_ols_flag ) { | |
|         vps_num_dpb_params_minus1 | ue(v) |
|         if( vps_max_sublayers_minus1 > 0 ) | |
|             vps_sublayer_dpb_params_present_flag | u(1) |
|         for( i = 0; i < VpsNumDpbParams; i++ ) { | |
|             if( !vps_all_layers_same_num_sublayers_flag ) | |
|                 vps_dpb_max_temporal_id[ i ] | u(3) |
|             dpb_parameters( vps_dpb_max_temporal_id[ i ], | |
|                 vps_sublayer_dpb_params_present_flag ) | |
|         } | |
|         for( i = 0; i < NumMultiLayerOlss; i++ ) { | |
|             vps_ols_dpb_pic_width[ i ] | ue(v) |
|             vps_ols_dpb_pic_height[ i ] | ue(v) |
|             vps_ols_dpb_chroma_format[ i ] | u(2) |
|             vps_ols_dpb_bitdepth_minus8[ i ] | ue(v) |
|             if( VpsNumDpbParams > 1 && VpsNumDpbParams != NumMultiLayerOlss ) | |
|                 vps_ols_dpb_params_idx[ i ] | ue(v) |
|         } | |
|         vps_general_hrd_params_present_flag | u(1) |
|         if( vps_general_hrd_params_present_flag ) { | |
|             general_hrd_parameters( ) | |
|             if( vps_max_sublayers_minus1 > 0 ) | |
|                 vps_sublayer_cpb_params_present_flag | u(1) |
|             vps_num_ols_hrd_params_minus1 | ue(v) |
|         for( i = 0; i <= vps_num_ols_hrd_params_minus1; i++ ) { | |
|             if( !vps_all_layers_same_num_sublayers_flag ) | |
|                 hrd_max_tid[ i ] | u(3) |
|             firstSubLayer = vps_sublayer_cpb_params_present_flag ? 0 : vps_hrd_max_tid[ i ] | |
|             ols_hrd_parameters( firstSubLayer, vps_hrd_max_tid[ i ] ) | |
|         } | |
|         if( vps_num_ols_hrd_params_minus1 > 0 && | |
|             vps_num_ols_hrd_params_minus1 + 1 != NumMultiLayerOlss ) | |
|             for( i = 0; i < NumMultiLayerOlss; i++ ) | |
|                 vps_ols_hrd_idx[ i ] | ue(v) |
|         } | |
|     } | |
|     vps_extension_flag | u(1) |
|     if( vps_extension_flag ) | |
|         while( more_rbsp_data( ) ) | |
|             vps_extension_data_flag | u(1) |
|     rbsp_trailing_bits( ) | |
| } | |

TABLE 2

Sequence parameter set RBSP syntax

|  | Descriptor |
|---|---|
| seq_parameter_set_rbsp( ) { | |
|     sps_seq_parameter_set_id | u(4) |
|     sps_video_parameter_set_id | u(4) |
|     sps_max_sublayers_minus1 | u(3) |
|     sps_reserved_zero_4bits | u(4) |
|     sps_ptl_dpb_hrd_params_present_flag | u(1) |
|     if( sps_ptl_dpb_hrd_params_present_flag ) | |
|         profile_tier_level( 1, sps_max_sublayers_minus1 ) | |
|     gdr_enabled_flag | u(1) |
|     chroma_format_idc | u(2) |
|     if( chroma_format_idc = = 3 ) | |
|         separate_colour_plane_flag | u(1) |
|     res_change_in_clvs_allowed_flag | u(1) |
|     pic_width_max_in_luma_samples | ue(v) |
|     pic_height_max_in_luma_samples | ue(v) |
|     sps_conformance_window_flag | u(1) |
|     if( sps_conformance_window_flag ) { | |

TABLE 2-continued

Sequence parameter set RBSP syntax

| | Descriptor |
|---|---|
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
| } | |
| sps_log2_ctu_size_minus5 | u(2) |
| subpic_info_present_flag | u(1) |
| if( subpic_info_present_flag ) { | |
|   sps_num_subpics_minus1 | ue(v) |
|   sps_independent_subpics_flag | u(1) |
|   for( i = 0; sps_num_subpics_minus1 > 0 && i <= sps_num_subpics_minus1; i++ ) { | |
|     if( i > 0 && pic_width_max_in_luma_samples > CtbSizeY ) | |
|       subpic_ctu_top_left_x[ i ] | u(v) |
|     if( i > 0 && pic_height_max_in_luma_samples > CtbSizeY ) { | |
|       subpic_ctu_top_left_y[ i ] | u(v) |
|     if( i < sps_num_subpics_minus1 && | |
|         pic_width_max_in_luma_samples > CtbSizeY ) | |
|       subpic_width_minus1[ i ] | u(v) |
|     if( i < sps_num_subpics_minus1 && | |
|         pic_height_max_in_luma_samples > CtbSizeY ) | |
|       subpic_height_minus1[ i ] | u(v) |
|     if( !sps_independent_subpics_flag) { | |
|       subpic_treated_as_pic_flag[ i ] | u(1) |
|       loop_filter_across_subpic_enabled_flag[ i ] | u(1) |
|     } | |
|   } | |
|   sps_subpic_id_len_minus1 | ue(v) |
|   subpic_id_mapping_explicitly_signalled_flag | u(1) |
|   if( subpic_id_mapping_explicitly_signalled_flag ) { | |
|     subpic_id_mapping_in_sps_flag | u(1) |
|     if( subpic_id_mapping_in_sps_flag ) | |
|       for( i = 0; i <= sps_num_subpics_minus1; i++ ) | |
|         sps_subpic_id[ i ] | u(v) |
|   } | |
| } | |
| bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
|   sps_sublayer_dpb_params_flag | u(1) |
| if( sps_ptl_dpb_hrd_params_present_flag ) | |
|   dpb_parameters( sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ){ | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |

TABLE 2-continued

Sequence parameter set RBSP syntax

| | Descriptor |
|---|---|
| if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
| } | |
| if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ){ | |
|         sps_log2_diff_max_bt_min_qt_intra_slice_chroma | ue(v) |
|         sps_log2_diff_max_tt_min_qt_intra_slice_chroma | ue(v) |
|     } | |
| } | |
| sps_max_luma_transform_size_64_flag | u(1) |
| if( ChromaArrayType != 0 ) { | |
|     sps_joint_cbcr_enabled_flag | u(1) |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|         qp_table_start_minus26[ i ] | se(v) |
|         num_points_in_qp_table_minus1[ i ] | ue(v) |
|         for( j = 0; j <= num_points_in_qp_table_minus1[ i ]; j++ ) { | |
|             delta_qp_in_val_minus1[ i ][ j ] | ue(v) |
|             delta_qp_diff_val[ i ][ j ] | ue(v) |
|         } | |
|     } | |
| } | |
| sps_sao_enabled_flag | u(1) |
| sps_alf_enabled_flag | u(1) |
| if( sps_alf_enabled_flag && ChromaArrayType != 0 ) | |
|     sps_ccalf_enabled_flag | u(1) |
| sps_transform_skip_enabled_flag | u(1) |
| if( sps_transform_skip_enabled_flag ) { | |
|     log2_transform_skip_max_size_minus2 | ue(v) |
|     sps_bdpcm_enabled_flag | u(1) |
| } | |
| sps_ref_wraparound_enabled_flag | u(1) |
| sps_temporal_mvp_enabled_flag | u(1) |
| if( sps_temporal_mvp_enabled_flag ) | |
|     sps_sbtmvp_enabled_flag | u(1) |
| sps_amvr_enabled_flag | u(1) |
| sps_bdof_enabled_flag | u(1) |
| if( sps_bdof_enabled_flag ) | |
|     sps_bdof_pic_present_flag | u(1) |
| sps_smvd_enabled_flag | u(1) |
| sps_dmvr_enabled_flag | u(1) |
| if( sps_dmvr_enabled_flag) | |
|     sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|     sps_cclm_enabled_flag | u(1) |
| if( chroma_format_idc == 1 ) { | |
|     sps_chroma_horizontal_collocated_flag | u(1) |
|     sps_chroma_vertical_collocated_flag | u(1) |
| } | |
| sps_mts_enabled_flag | u(1) |
| if( sps_mts_enabled_flag ) { | |
|     sps_explicit_mts_intra_enabled_flag | u(1) |
|     sps_explicit_mts_inter_enabled_flag | u(1) |
| } | |
| six_minus_max_num_merge_cand | ue(v) |
| sps_sbt_enabled_flag | u(1) |
| sps_affine_enabled_flag | u(1) |
| if( sps_affine_enabled_flag ) { | |
|     five_minus_max_num_subblock_merge_cand | ue(v) |
|     sps_affine_type_flag | u(1) |
|     if( sps_amvr_enabled_flag ) | |
|         sps_affine_amvr_enabled_flag | u(1) |
|     sps_affine_prof_enabled_flag | u(1) |
|     if( sps_affine_prof_enabled_flag ) | |
|         sps_prof_pic_present_flag | u(1) |
| } | |

TABLE 2-continued

Sequence parameter set RBSP syntax

| | Descriptor |
|---|---|
| sps_palette_enabled_flag | u(1) |
| if( ChromaArrayType = = 3 && !sps_max_luma_transform_size_64_flag ) | |
|     sps_act_enabled_flag | u(1) |
| if( sps_transform_skip_enabled_flag \|\| sps_palette_enabled_flag ) | |
|     min_qp_prime_ts_minus4 | ue(v) |
| sps_bcw_enabled_flag | u(1) |
| sps_ibc_enabled_flag | u(1) |
| if( sps_ibc_enabled_flag ) | |
|     six_minus_max_num_ibc_merge_cand | ue(v) |
| sps_ciip_enabled_flag | u(1) |
| if( sps_mmvd_enabled_flag ) | |
|     sps_fpel_mmvd_enabled_flag | u(1) |
| if( MaxNumMergeCand >= 2 ) { | |
|     sps_gpm_enabled_flag | u(1) |
|     if( sps_gpm_enabled_flag && MaxNumMergeCand >= 3 ) | |
|         max_num_merge_cand_minus_max_num_gpm_cand | ue(v) |
| } | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|         sps_ladf_qp_offset[ i ] | se(v) |
|         sps_ladf_delta_threshold_minus1[ i ] | ue(v) |
|     } | |
| } | |
| log2_parallel_merge_level_minus2 | ue(v) |
| sps_explicit_scaling_list_enabled_flag | u(1) |
| sps_dep_quant_enabled_flag | u(1) |
| if( !sps_dep_quant_enabled_flag ) | |
|     sps_sign_data_hiding_enabled_flag | u(1) |
| sps_virtual_boundaries_enabled_flag | u(1) |
| if( sps_virtual_boundaries_enabled_flag ) { | |
|     sps_virtual_boundaries_present_flag | u(1) |
|     if( sps_virtual_boundaries_present_flag ) { | |
|         sps_num_ver_virtual_boundaries | u(2) |
|         for( i = 0; i < sps_num_ver_virtual_boundaries; i++ ) | |
|             sps_virtual_boundaries_pos_x[ i ] | u(13) |
|         sps_num_hor_virtual_boundaries | u(2) |
|         for( i = 0; i < sps_num_hor_virtual_boundaries; i++ ) | |
|             sps_virtual_boundaries_pos_y[ i ] | u(13) |
|     } | |
| } | |
| if( sps_ptl_dpb_hrd_params_present_flag ) { | |
|     sps_general_hrd_params_present_flag | u(1) |
|     if( sps_general_hrd_params_present_flag ) { | |
|         general_hrd_parameters( ) | |
|         if( spsmax_sublayers_minus1 > 0 ) | |
|             sps_sublayer_cpb_params_present_flag | u(1) |
|         firstSubLayer = sps_sublayer_cpb_params_present_flag ? 0 : | |
|             sps_max_sublayers_minus1 | |
|         ols_hrd_parameters( firstSubLayer, sps_max_sublayers_minus1 ) | |
|     } | |
| } | |
| field_seq_flag | u(1) |
| vui_parameters_present_flag | u(1) |
| if( vui_parameters_present_flag ) | |
|     vui_parameters( ) /* Specified in ITU-T H.SEI \| ISO/IEC 23002-7 */ | |
| sps_extension_flag | u(1) |
| if( sps_extension_flag ) | |
|     while( more_rbsp_data( ) ) | |
|         sps_extension_data_flag | u(1) |
| rbsp_trailing_bits( ) | |
| } | |

What is claimed is:

1. A method performed by at least one processor, the method comprising:

receiving a bitstream including at least one coded picture;

inferring a value of a first identifier of a video parameter set, based on the first identifier of the video parameter set not being in the bitstream;

inferring a value of a syntax element, that indicates an output layer set mode, based on a first flag indicating that all layers specified by the video parameter set are independently coded without using inter-layer prediction, and based on a second flag indicating that each layer in a coded video sequence (CVS), referring to the video parameter set, is an output layer set (OLS) containing only one layer; and decoding the at least one coded picture based on the inferring the value of the first identifier and the inferring the value of the syntax element.

2. The method of claim 1, wherein the inferring the value of the first identifier comprises inferring the value of the first identifier as 0 based on the first identifier of the video parameter set not being in the bitstream.

3. The method of claim 1, wherein the value of the first identifier indicates that the video parameter set is not present in the bitstream.

4. The method of claim 1, further comprises:
inferring a value of a second identifier of a layer of the video parameter set based on the first identifier of the video parameter set not being in the bitstream.

5. The method of claim 4, wherein the inferring the value of the second identifier comprises inferring the value of the second identifier as 0 based on the first identifier of the video parameter set not being in the bitstream.

6. The method of claim 1, further comprises:
inferring a value of a third flag based on the third flag not being in the bitstream, wherein the third flag indicates whether another syntax element is present that indicates whether pictures of a layer, specified by the video parameter set, are used as interlayer reference pictures (ILRPs).

7. The method of claim 6, wherein the inferring the value of the third flag comprises inferring the value of the third flag as 0 based on the third flag not being in the bitstream.

8. The method of claim 1, wherein the inferring the value of the syntax element comprises inferring the value of the syntax element as 0 based on the first flag having a value of 1 and the second flag having a value of 1.

9. The method of claim 1, wherein
the inferring the value of the syntax element comprises inferring the value of the syntax element as a value that indicates the output layer set mode is a mode in which:
a total number of OLSs specified by the video parameter set is equal to a total number of the layers specified by the video parameter set,
an i-th OLS from among the OLSs includes layers with layer indices from 0 to i, inclusive, and
for each OLS from among the OLSs, only a highest layer in the OLS is an output layer.

10. The method of claim 1, wherein
the first identifier provides an identification (ID) of the video parameter set, based on the value of the first identifier being greater than 0, and
the first identifier indicates that the video parameter set is not present in the bitstream, based on the value of the first identifier being equal to 0.

11. A system comprising:
at least one memory storing computer code; and
at least one processor configured to receive a bitstream comprising at least one coded picture, the at least one processor further configured to access the computer code and operate as instructed by the computer code, the computer code including:
inferring code configured to cause the at least one processor to:
infer a value of a first identifier of a video parameter set, based on the first identifier of the video parameter set not being in the bitstream, and
infer a value of a syntax element, that indicates an output layer set mode, based on a first flag indicating that all layers specified by the video parameter set are independently coded without using inter-layer prediction, and based on a second flag indicating that each layer in a coded video sequence (CVS), referring to the video parameter set, is an output layer set (OLS) containing only one layer; and decoding code configured to cause the at least one processor to decode the at least one coded picture based on the inferring the value of the first identifier and the inferring the value of the syntax element.

12. The system of claim 11, wherein the inferring code is configured to cause the at least one processor to infer the value of the first identifier as 0 based on the first identifier of the video parameter set not being in the bitstream.

13. The system of claim 11, wherein the value of the first identifier indicates that the video parameter set is not present in the bitstream.

14. The system of claim 11, wherein the inferring code is further configured to cause the at least one processor to infer a value of a second identifier of a layer of the video parameter set based on the first identifier of the video parameter set not being in the bitstream.

15. The system of claim 14, wherein the inferring code is configured to cause the at least one processor to infer the value of the second identifier as 0 based on the first identifier of the video parameter set not being in the bitstream.

16. The system of claim 11, wherein
the inferring code is further configured to cause the at least one processor to infer a value of a third flag based on the third flag not being in the bitstream, and
the third flag indicates whether another syntax element is present that indicates whether pictures of a layer, specified by the video parameter set, are used as interlayer reference pictures (ILRPs).

17. The system of claim 16, wherein the inferring code is configured to cause the at least one processor to infer the value of the third flag as 0 based on the third flag not being in the bitstream.

18. The system of claim 11, wherein the inferring code is configured to cause the at least one processor to infer the value of the syntax element as 0 based on the first flag having a value of 1 and the second flag having a value of 1.

19. A non-transitory computer-readable medium storing computer code that is configured to, when executed by at least one processor, cause the at least one processor to:
infer a value of a first identifier of a video parameter set, based on the first identifier of the video parameter set not being in a received bitstream that includes at least one coded picture;
infer a value of a syntax element, that indicates an output layer set mode, based on a first flag indicating that all layers specified by the video parameter set are independently coded without using inter-layer prediction, and based on a second flag indicating that each layer in a coded video sequence (CVS), referring to the video parameter set, is an output layer set (OLS) containing only one layer; and
decode the at least one coded picture based on inferring the value of the first identifier and inferring the value of the syntax element.

20. The system of claim 11, wherein
the first identifier provides an identification (ID) of the video parameter set, based on the value of the first identifier being greater than 0, and the first identifier indicates that the video parameter set is not present in the bitstream, based on the value of the first identifier being equal to 0.

\* \* \* \* \*